US012711145B2

(12) United States Patent
Barton et al.

(10) Patent No.: US 12,711,145 B2
(45) Date of Patent: Aug. 18, 2026

(54) CRAWLING DATA TRANSFORMS

(71) Applicant: Nextworld, LLC, Greenwood Village, CO (US)

(72) Inventors: Kendra Barton, Parker, CO (US); Connor Pashak, Greenwood Village, CO (US); Robert Keefer, Denver, CO (US); David Allen Schneider, Aurora, CO (US); Cheyanne Miller, Englewood, CO (US); Sam Maschka, Greenwood Village, CO (US); Turner Sedberry, Greenwood Village, CO (US); Tyler Michael Barton, Parker, CO (US)

(73) Assignee: Nextworld, LLC, Greenwood Village, CO (US)

( * ) Notice: Subject to any disclaimer, the term of this patent is extended or adjusted under 35 U.S.C. 154(b) by 0 days.

(21) Appl. No.: 18/771,667

(22) Filed: Jul. 12, 2024

(65) Prior Publication Data

US 2025/0328542 A1 Oct. 23, 2025

Related U.S. Application Data

(60) Provisional application No. 63/636,925, filed on Apr. 22, 2024.

(51) Int. Cl.
*G06F 16/25* (2019.01)
*G06F 16/22* (2019.01)

(52) U.S. Cl.
CPC ........ *G06F 16/254* (2019.01); *G06F 16/2282* (2019.01)

(58) Field of Classification Search
None
See application file for complete search history.

(56) References Cited

U.S. PATENT DOCUMENTS

2011/0099503 A1* 4/2011 Golani .................. G06F 16/254 709/221
2016/0117375 A1* 4/2016 Antonopoulos ...... G06F 16/219 707/638
2022/0019565 A1* 1/2022 Nagayanallur Subramanian ........ G06F 11/3419
2022/0253216 A1* 8/2022 Grunwald ............. G06F 3/0604

* cited by examiner

*Primary Examiner* — Umar Mian

(57) ABSTRACT

Technology disclosed herein includes systems and methods for transforming large amounts of transactional or system data with no downtime and little to no impact on the end user experience. More specifically, systems and methods for performing crawling data transforms are disclosed in which data transforms run as timed and throttled background processes to reduce the required processing resources and eliminate the need for downtime. A method for performing crawling data transforms includes generating transformation plans having multiple steps based on a transform definition, determining that a number of running plans is below a threshold, determining that a number of running steps is below a threshold, identifying an uncompleted table within a step of a transformation plan, and transforming records in the uncompleted table until all records in the table are transformed or the step is terminated.

20 Claims, 13 Drawing Sheets

Figure 9A:
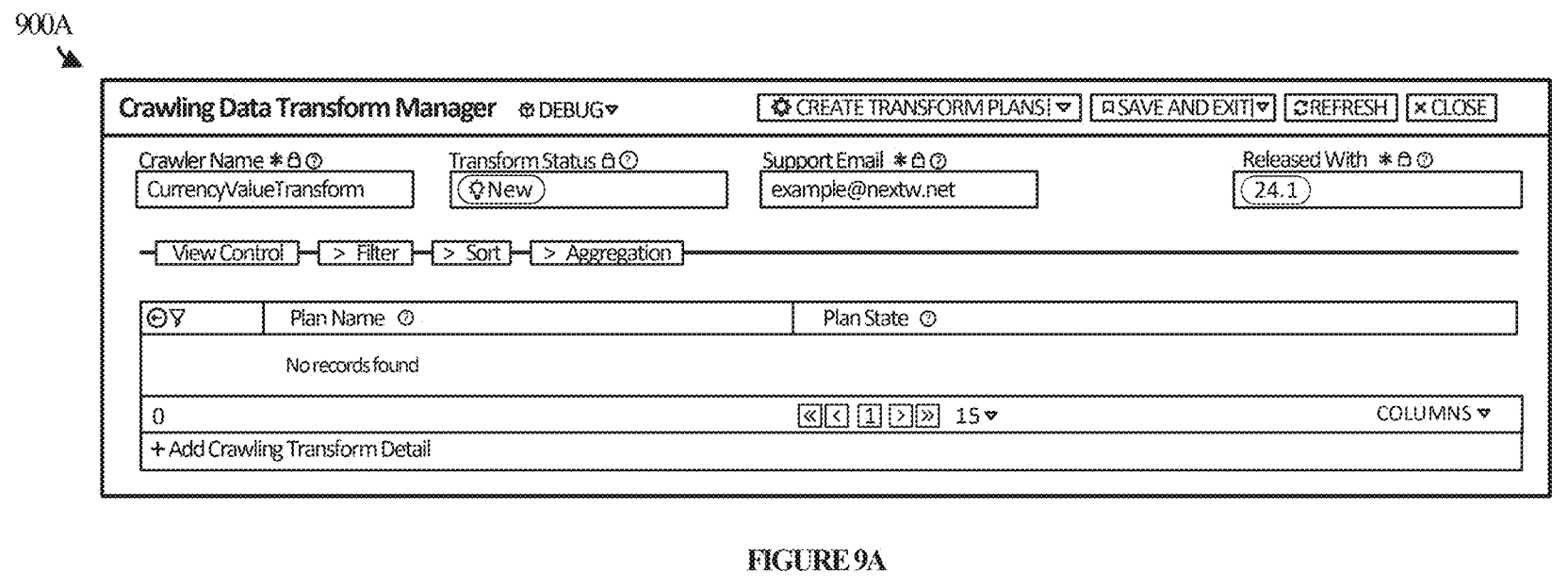

900A

Crawling Data Transform Manager
DEBUG
CREATE TRANSFORM PLANS
SAVE AND EXIT
REFRESH
CLOSE Crawler Name
CurrencyValueTransform
Transform Status
New
Support Email
example@nextw.net
Released With
24.1

View Control
> Filter
> Sort
> Aggregation

Plan Name
Plan State
No records found
0
15
COLUMNS
+ Add Crawling Transform Detail

Crawling Data Transform Manager
DEBUG
CREATE TRANSFORM PLANS
SAVE AND EXIT
REFRESH
CLOSE Crawler Name *
CurrencyValueTransform
Transform Status
New
Support Email *
example@nextw.net
Released With *
24.1

View Control
> Filter
> Sort
> Aggregation

| Plan Name | Plan State |
|---|---|
| CurrencyValueTransform - UTC | New |
| CurrencyValueTransform ~ US/Eastern | New |
| CurrencyValueTransform ~ US/Mountain | New |

3
1
15
COLUMNS
+ Add Crawling Transform Detail

Figure 9C:
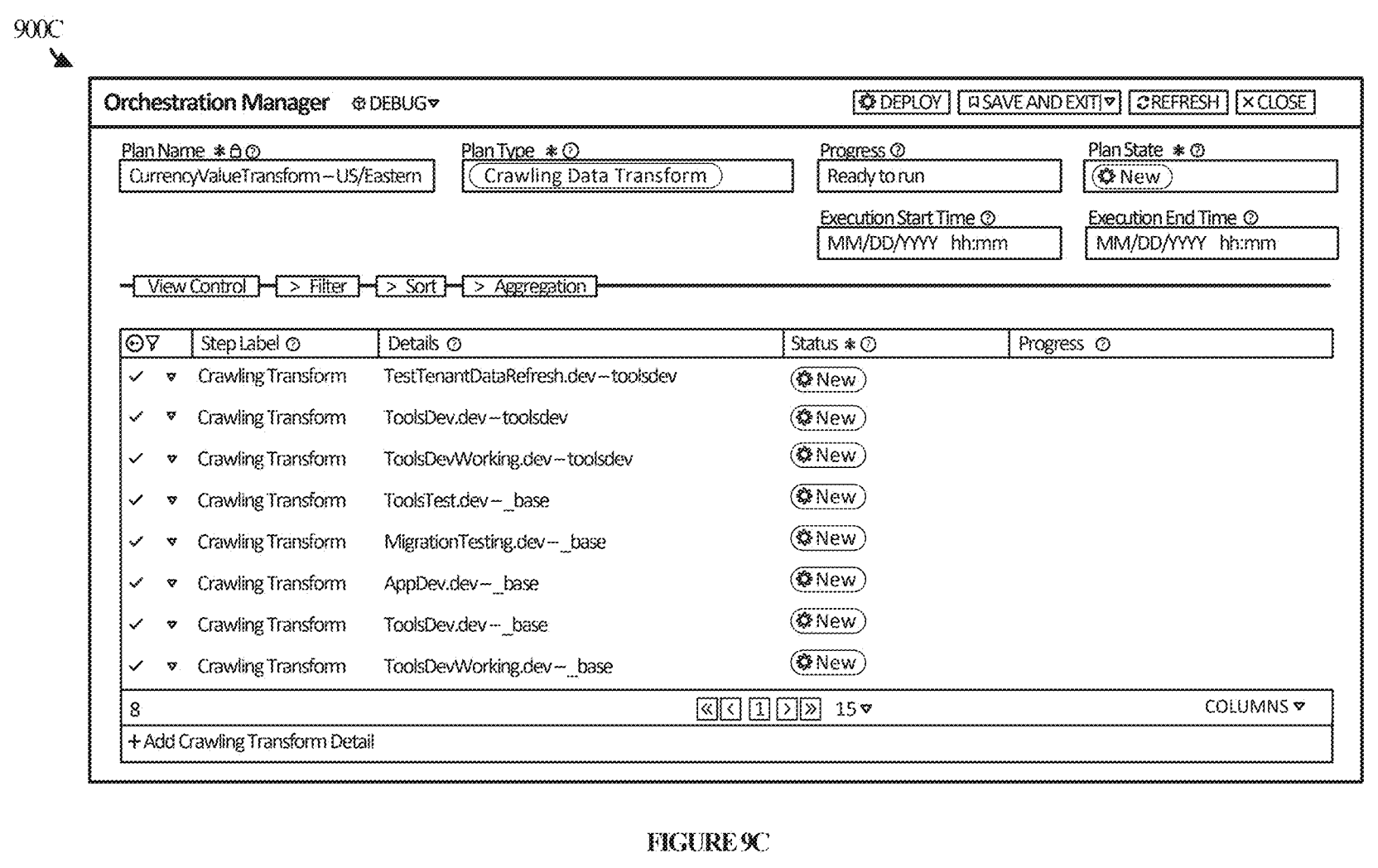

Orchestration Manager DEBUG

DEPLOY | SAVE AND EXIT | REFRESH | × CLOSE

Plan Name * : CurrencyValueTransform ~ US/Eastern

Plan Type * : Crawling Data Transform

Progress : Ready to run

Plan State * : New

Execution Start Time : MM/DD/YYYY hh:mm

Execution End Time : MM/DD/YYYY hh:mm

View Control | > Filter | > Sort | > Aggregation

| | | Step Label | Details | Status * | Progress |
|---|---|---|---|---|---|
| ✓ | ▿ | Crawling Transform | TestTenantDataRefresh.dev ~ toolsdev | New | |
| ✓ | ▿ | Crawling Transform | ToolsDev.dev ~ toolsdev | New | |
| ✓ | ▿ | Crawling Transform | ToolsDevWorking.dev ~ toolsdev | New | |
| ✓ | ▿ | Crawling Transform | ToolsTest.dev ~ _base | New | |
| ✓ | ▿ | Crawling Transform | MigrationTesting.dev ~ _base | New | |
| ✓ | ▿ | Crawling Transform | AppDev.dev ~ _base | New | |
| ✓ | ▿ | Crawling Transform | ToolsDev.dev ~ _base | New | |
| ✓ | ▿ | Crawling Transform | ToolsDevWorking.dev ~ _base | New | |

8 « ‹ 1 › » 15 COLUMNS

+ Add Crawling Transform Detail

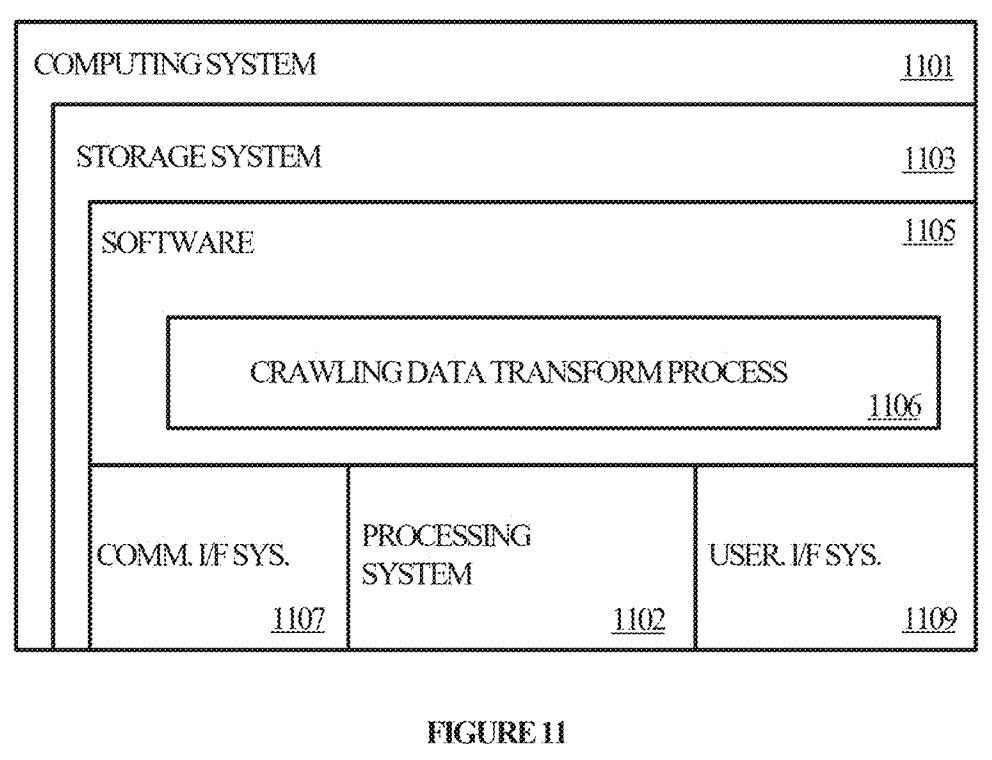

COMPUTING SYSTEM 1101

STORAGE SYSTEM 1103

SOFTWARE 1105

CRAWLING DATA TRANSFORM PROCESS 1106

COMM. I/F SYS. 1107

PROCESSING SYSTEM 1102

USER. I/F SYS. 1109

FIGURE 11

CRAWLING DATA TRANSFORMS

CROSS-REFERENCE TO RELATED APPLICATIONS

This application claims priority to U.S. Provisional Application No. 63/636,925 titled CRAWLING DATA TRANSFORMS, filed Apr. 22, 2024, which is incorporated herein by reference in its entirety for all purposes.

BACKGROUND

Downtime is often considered necessary for transforming large volumes of customer data, such as in cloud-based enterprise resource planning (ERP) systems. However, downtime presents significant drawbacks that can negatively impact business operations. This required downtime, especially in today's fast-paced market environment, can be a major inconvenience and a competitive disadvantage.

The need for downtime disrupts continuous service availability, which is a critical aspect of customer satisfaction and service delivery. In certain sectors where real-time data access and transaction capabilities are essential (e.g., finance, retail, etc.), any period of inactivity can lead to missed opportunities, customer dissatisfaction, and revenue loss.

Moreover, scheduling and planning for downtime can be a complex logistical challenge. ERP providers may be required to forecast the least disruptive time to schedule downtime, which often falls during late night hours, placing additional strain on technical teams and their employees, in addition to raising operational costs. Even worse, if the downtime extends beyond the anticipated window due to the size of the required transform, unforeseen complications, or errors, the consequences amplify, leading to increased frustration among customers and internal stakeholders.

Thus, although downtime may be intended to facilitate seamless data transformations within big data systems, it negatively impacts business continuity and imposes significant operational and reputational risks.

It is with respect to this general technical environment that aspects of the technology disclosed herein have been contemplated. Furthermore, although a general environment has been discussed, it should be understood that the examples described herein should not be limited to the general environment identified in the background.

BRIEF SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various embodiments of the present technology generally relate to systems and methods for transforming large amounts of data over extended periods of time. More specifically, some embodiments relate to systems and methods for performing crawling data transformations in a manner that throttles impact to tenant systems and negates the need for downtime. In accordance with an embodiment of the present disclosure, a method of operating a computing system in accordance with the present disclosure includes receiving information defining a data transformation and generating a data transformation plan having multiple steps. Each step of the multiple steps includes at least one table storing data to transform according to the data transformation. The method further includes determining that a number of running steps is less than a maximum number of running steps and, upon determining that the number of running steps is less than the maximum number of running steps, identifying an uncompleted table in the data transformation plan. The method further includes transforming an uncompleted record in the uncompleted table to generate a transformed record and updating the uncompleted table with the transformed record.

In some embodiments, the method further includes, prior to identifying the uncompleted table in the data transformation plan, determining that a number of running data transformation plans is less than a maximum number of running data transformation plans. Additionally, the method may include, upon determining that that the number of running data transformation plans is less than the maximum number of running data transformation plans, determining that a next data transformation plan that is not running is inside a transform time window and initiating the next data transformation plan. The method may include, in some examples, determining that the data transformation plan is outside a transform time window and terminating the data transformation plan. The method may further include, in some examples, generating a second data transformation plan having multiple steps, where each step of the multiple steps of the second data transformation plan includes at least one table storing data to transform according to the data transformation. The method may include, upon transforming the uncompleted record and updating the uncompleted table with the transformed record, updating a progress table indicating that the uncompleted record was transformed. In some examples, the method further includes, after transforming the uncompleted record and updating the uncompleted table with the transformed record, determining that the uncompleted table has no additional uncompleted records and updating a progress table indicating that transforming the uncompleted table according to the data transformation is complete. After determining that the uncompleted table has no additional uncompleted records, the computing system performing the method may identify a second uncompleted table, transform every uncompleted record in the second uncompleted table, and update the progress table indicating that transforming the second uncompleted table according to the data transformation is complete. Furthermore, the computing system performing the method may determine that no uncompleted tables remain and update the progress table indicating that a step of the multiple steps of the data transformation plan is complete. The computing system performing the method may further determine that no uncompleted steps of the data transformation plan remain and update the progress table indicating that the data transformation plan is complete.

In an alternative embodiment, one or more computer-readable storage media have program instructions stored thereon for performing crawling data transforms. The program instructions, when read and executed by a processing system, direct the processing system to receive information defining a data transformation, generate a data transformation plan having multiple steps, determine that a number of running steps is less than a maximum number of running steps, identify an uncompleted table in the data transformation plan, transform an uncompleted record in the uncompleted table to generate a transformed record, and update the uncompleted table with the transformed record.

In yet another embodiment, a system includes one or more computer-readable storage media, a processing system operatively coupled with the one or more computer-readable storage media, and program instructions stored on the one or more computer-readable storage media for providing crawling data transformation capabilities. The program instructions, when read and executed by the processing system, direct the processing system to receive information defining a data transformation and generate a data transformation plan having multiple steps. Each step of the multiple steps includes at least one table storing data to transform according to the data transformation. The program instructions further direct the processing system to determine that a number of running steps is less than a maximum number of running steps and, upon determining that the number of running steps is less than the maximum number of running steps, identify an uncompleted table in the data transformation plan. The program instructions further direct the processing system to transform an uncompleted record in the uncompleted table to generate a transformed record and update the uncompleted table with the transformed record.

BRIEF DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIGS. 9A-9C illustrate an example of a graphical user interface for implementing crawling data transforms in accordance with some embodiments of the present technology;

FIG. 10 illustrates an example of a graphical user interface for implementing crawling data transforms in accordance with some embodiments of the present technology; and FIG. 11 is an example of a computing system in which some embodiments of the present technology may be utilized.

Figure 1:
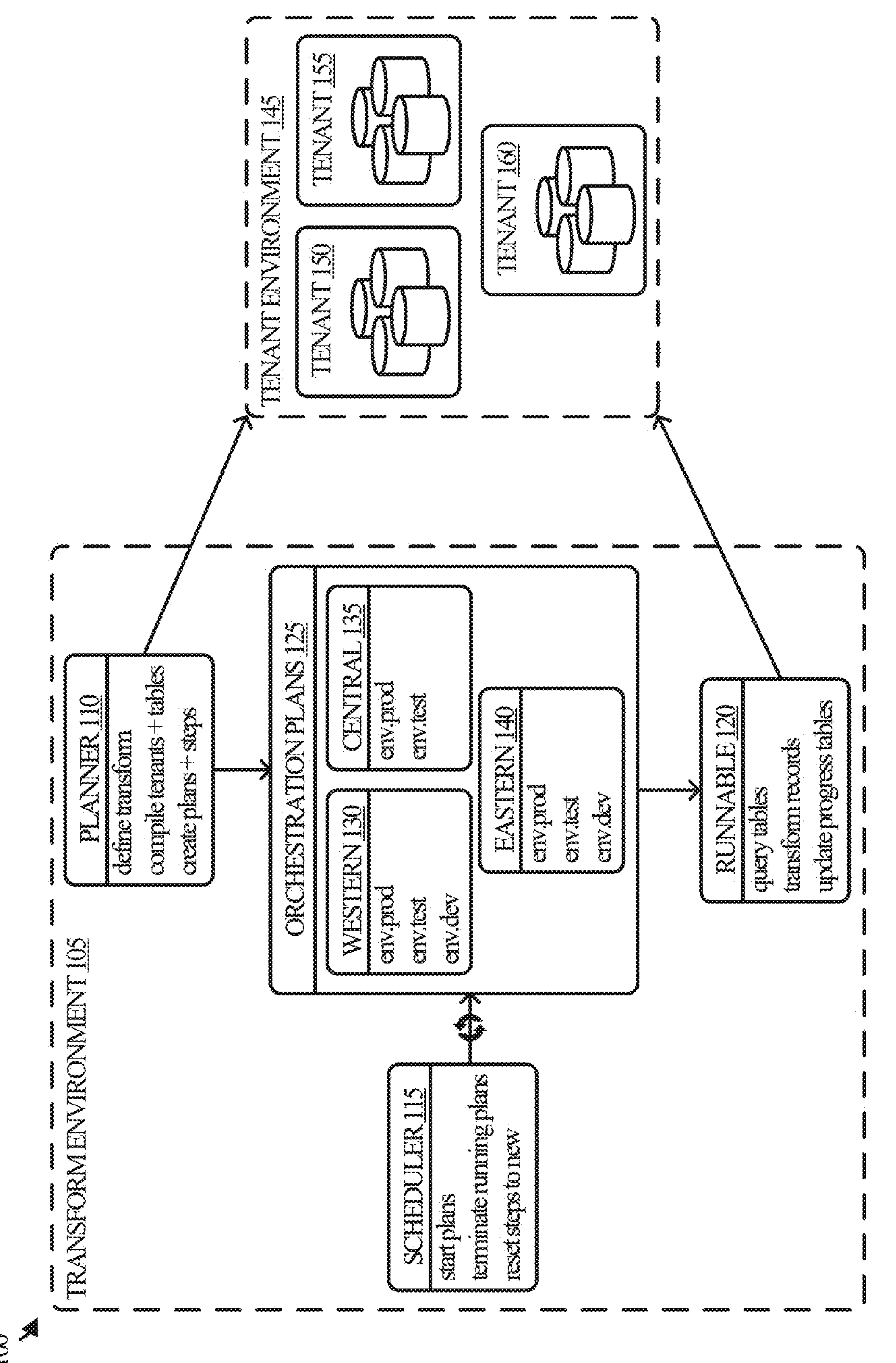
FIG. 1 illustrates an example of a crawling data transform environment in accordance with some embodiments of the present technology.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

The present technology generally relates to systems and methods for transforming large amounts of transactional or system data with no downtime and little to no impact on the end user experience. More specifically, systems and methods for crawling data transforms are disclosed in which data transforms run as timed and throttled background processes to reduce the required processing resources and eliminate the need for downtime. Crawling data transforms, in accordance with the present disclosure, are suitable for large-scale data transformations that can take place over an extended period of time, such as several hours, days, weeks, or months. Crawling data transforms allow such large transformations to take place while the system is live and while customers may be interacting with the system.

Cloud service providers (e.g., PaaS providers, SaaS providers, IaaS providers, etc.), such as cloud-based enterprise resource planning (ERP) providers, face challenges with performing data transformations. Sometimes, large amounts of data, including customer data, must be transformed. For example, if a future release of the software requires data to be formatted in a particular way different from how it was previously formatted, every record containing that type of data must be transformed before the new version of the software can be released. However, running such large-scale transformations can take a very long time and therefore disrupt business processes by necessitating downtime or hogging resources. Typically, batch processing is used for large transformations to get them done quickly, but system downtime is required during the batch processing period during which customers are unable to interact with the system. Thus, performing data transformations in this way has a direct business impact and is undesirable for businesses and customers.

Therefore, systems and methods for performing background crawling data transforms are disclosed herein. A crawling data transform, in accordance with the present disclosure, is a background process that is intentionally throttled to reduce impact on tenant resources and eliminate the need for downtime. Three primary components are introduced herein to support crawling data transforms: a planner, a scheduler, and a runnable.

The planner is responsible for finding all tables needing transformed in each environment for each tenant and then creating orchestration plans and their steps to carry out the transformations. The scheduler is responsible for scheduling jobs (i.e., the running of the orchestration plans), as well as starting and stopping the jobs according to time constraints associated with each plan. In some examples, the scheduler wakes up at regular intervals (e.g., every one hour) to check if any running plans need to be terminated and if any plans can be started. In some examples, plans are terminated and started based on their associated time zones and "off hours." The runnable is responsible for performing the steps of each plan by transforming the associated records. In an example, the runnable performs a step of a plan by identifying the next table in the step that needs transformed, checking for existing progress in transforming the table, transforming the records in the table until the table is complete or the plan is terminated, and writing to a progress table to track progress on the step.

Various technical effects may be appreciated from the implementations disclosed herein. One such technical effect is the elimination of the need for downtime and reduced customer impact during the execution of large-scale data transformations. An additional technical effect is the reduction of processing resources required at one time to perform large-scale data transformations.

FIG. 1 illustrates environment 100 in which crawling data transform systems and processes are implemented in accordance with some embodiments of the present technology. Environment 100 includes transform environment 105 and tenant environment 145. Transform environment 105 includes planner 110, scheduler 115, runnable 120, and orchestration plans 125. Orchestration plans 125 includes western plan 130, central plan 135, and eastern plan 140. Tenant environment 145 includes tenant 150, tenant 155, and tenant 160. In other examples, transform environment 105 and tenant environment 145 may include additional or different elements than those included in the example of FIG. 1.

Planner 110, in the example of FIG. 1, first receives a definition of a data transformation. The definition of the data transformation includes what type of data needs to be transformed and how it needs to be transformed. For example, the definition of the data transform may indicate that all records containing a date field in them need to be transformed such that the date is stored in a different format. Planner 110, upon receiving the definition of the data transformation, compiles the list of tables that need transformed from tenant environment 145—this list may include all tables associated with an environment being transformed or may include only the tables that include one or more records having a date field. In some cases having a multitude of tenants and/or environments, planner 110 also compiles a list of all environments to transform in addition to a list of all tables to transform in each environment. Planner 110 then creates orchestration plans 125 defining the transformation schedule and splitting up the work. In the example of FIG. 1, planner 110 creates three orchestration plans, with each orchestration plan corresponding to a different time zone-western plan 130, central plan 135, and eastern plan 140. Each orchestration plan of orchestration plans 125 includes several steps with each step corresponding to a different target environment for each tenant to transform. For example, tenant 150 may include three target environments needing transformed and would therefore have three associated steps, which may be grouped into the same plan or different plans among orchestration plans 125. In other examples, orchestration plans and their steps may be divided based on different factors than those used to divide plans and steps in the example of FIG. 1.

Scheduler 115 schedules and manages the execution of orchestration plans 125 once created by planner 110. Scheduler 115 is responsible for throttling and timing the transformation process to ensure minimal impact on tenant environments and avoid performing transformations during key business hours. Scheduler 115, in the present example, manages plans based on tenant off hours. In the present example, off hours are scheduled from 11 PM to 5 AM in each tenant's associated time zone. Thus, when the western time zone associated with western plan 130 reaches 11 PM, scheduler 115 kicks off western plan 130, sending its steps to runnable 120 to begin transforming records in the tables listed in western plan 130. Similarly, scheduler 115 terminates running plans at the end of their associated off hours. Thus, when the western time zone associated with western plan 130 reaches 5 AM, scheduler 115 terminates all steps associated with western plan 130 being executed by runnable 120. Upon terminating uncompleted steps, scheduler 115 also resets the status of the uncompleted steps to new to ensure the steps are picked back up by runnable 120 in the future. As described further in reference to runnable 120, runnable 120 also stores the progress made through a step in a progress table so that records are not repeated when a terminated step is re-started. In this way, the performance of single steps can be spread out over multiple days without losing progress upon each termination. Each time a step is kicked off, runnable 120 checks for existing progress before continuing to transform records from that point.

In addition to managing the running of orchestration plans 125 during tenant off hours, scheduler 115 is responsible for throttling the number of plans and steps that are running at one time to ensure that, even though the plans are running during "off hours", there is little to no impact on the end user experience. In the example of FIG. 1, scheduler 115 is configured to only allow two orchestration plans to run simultaneously. Thus, if eastern plan 140 and central plan 135 are already running when the western time zone hits 11 PM, western plan 130 will not get kicked off until one of eastern plan 140 or central plan 135 is terminated or completed. In addition to limiting the number of plans running at one time, scheduler 115 limits the number of steps in each plan that can run simultaneously. In the example of FIG. 1, scheduler 115 is configured to only allow two steps per plan to run at the same time. Thus, the maximum number of total steps across all plans that can be running simultaneously is four, in the example of FIG. 1.

Scheduler 115, in the present example, wakes up every hour on the hour and first checks if any running plans are now in off hours and need to be terminated. If so, scheduler 115 terminates those plans and resets the status of any interrupted steps back to new. Scheduler 115 then checks if any plans that are not running are now in off hours. If so, scheduler 115 checks the number of running plans to see if it is less than two. If less than two plans are running, scheduler 115 kicks off any plan(s) that are now in off hours until the maximum number of plans (2) is reached. While the maximum number of plans is set to two and the maximum number of steps per plan is set to two in the present example, these numbers are configurable and may differ in other examples. Similarly, off hours may be scheduled for any time frame including daily, weekly, or monthly time frames (e.g., weekends only). While the off hours are the same for all tenants in the present example, off hours may vary between tenants or tenant environments in other examples.

Runnable 120 is responsible for implementing the steps of orchestration plans 125 and therefore performing the data transforms in the list of tables for each plan. Runnable 120 utilizes the transform definition included in each orchestration plan by planner 110 defining what data to transform and how to transform it. When runnable 120 is executing a step from an orchestration plan, it works through the tables listed in the step one-by-one, querying every single record in the table one-by-one to find records that need to be transformed (i.e., containing data that needs to be transformed as defined in the transform definition). When runnable 120 finds a record that needs transformed, it feeds the record (e.g., a JSON blob or other form of data) to the transform (i.e., runs it through code defining the transform) and the transform code returns a new record (e.g., new JSON blob or other form of data) with the changes. Runnable 120 then updates the table with the transformed data.

Runnable 120, in addition to transforming the records, saves transformation progress in one or more progress tables. As previously described, some tables are too large to finish in a single transform window (e.g., during one scheduled off hours period). Additionally, steps that get picked up late in the transform window are unlikely to be completed in the same transform window. For these reasons, the examples provided herein include a method for tracking progress through steps that allows for those steps to be picked up where they were left off in the next transform window. Thus, runnable 120, in the present example, updates one or more progress tables each time it queries or updates a record. In other examples, runnable 120 updates the one or more progress tables at regular intervals (e.g., every 100 records or every 5 minutes). In this way, runnable 120 plays a role in tracking the progress through each step of an orchestration plan. When a step is terminated by scheduler 115, runnable 120 also updates the one or more progress tables indicating where it left off. When runnable 120 picks up a new step, it checks the one or more progress tables to find out whether the step is already partially completed and if so, where it left off.

Figure 2:
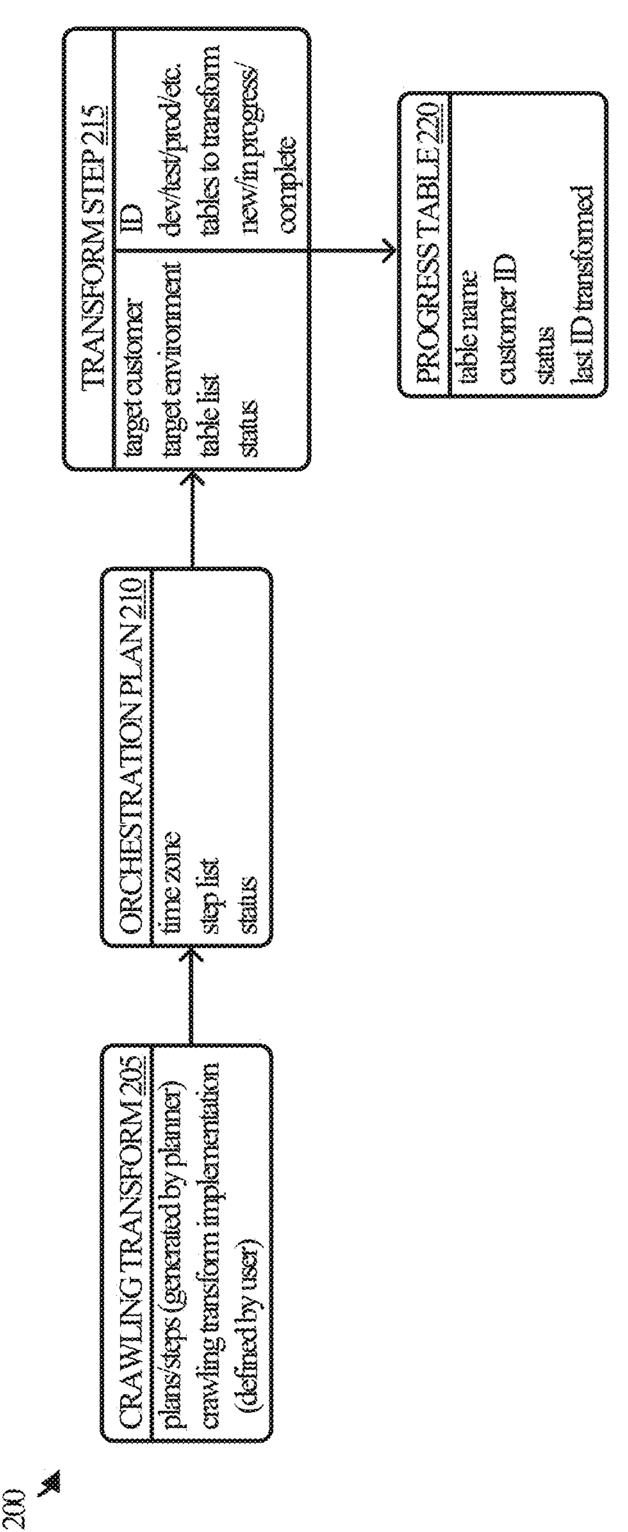
FIG. 2 illustrates an example of a series of elements associated with crawling data transforms in accordance with some embodiments of the present technology.

FIG. 2 illustrates crawling transform environment 200, demonstrating elements that are created and/or updated by various components of transform environment 105 from FIG. 1. Crawling transform environment includes crawling transform 205, orchestration plan 210, transform step 215, and progress table 220. Crawling transform 205 includes one or more orchestration plans and one or more steps for each orchestration plan. The orchestration plans and steps of crawling transform 205 are generated by planner 110. Crawling transform 205 also includes the crawling transform implementation (i.e., transform definition) as defined by the user that initiated the transform process.

Crawling transform 205 includes orchestration plan 210. Orchestration plan 210, in the example of FIG. 1, is associated with a time zone, and includes all data environments associated with that time zone. Orchestration plan 210 also includes a step list, which includes all the steps of orchestration plan 210 as created by planner 110. Orchestration plan 210 also includes a status indicating whether the plan is new, in progress, terminated, completed, or the like. The status allows scheduler 115 to identify which plans still need to be run and is updated by scheduler 115 when plans are kicked off, terminated, or completed.

Orchestration plan 210 includes transform step 215. Transform step 215 is a single step from orchestration plan 210 as created by planner 110. Transform step 215 is what gets picked up by runnable 120 when instructed to do so by scheduler 115. Transform step 215 includes information directing runnable 120 what to transform, the information including the ID of a target customer, an ID of a target environment, a list of tables to transform, and a status. Similar to the status of orchestration plan 210, the status of transform step 215 may indicate whether the step is new, in progress, terminated, completed, or the like and is updated by scheduler 115.

Progress table 220 is updated by runnable 120 as it works through transform step 215. Progress table 220 includes the fields table name, customer ID, status, and last ID transformed. Thus, progress table 220 stores information about the progress made on each table in transform step 215 but may also store information about the progress made in other transform steps. In some examples, progress table 220 is associated with the specific environment that transform step 215 is associated with and therefore stores information about the progress made through any steps of crawling transform 205 that correspond to the same environment.

Figure 3:
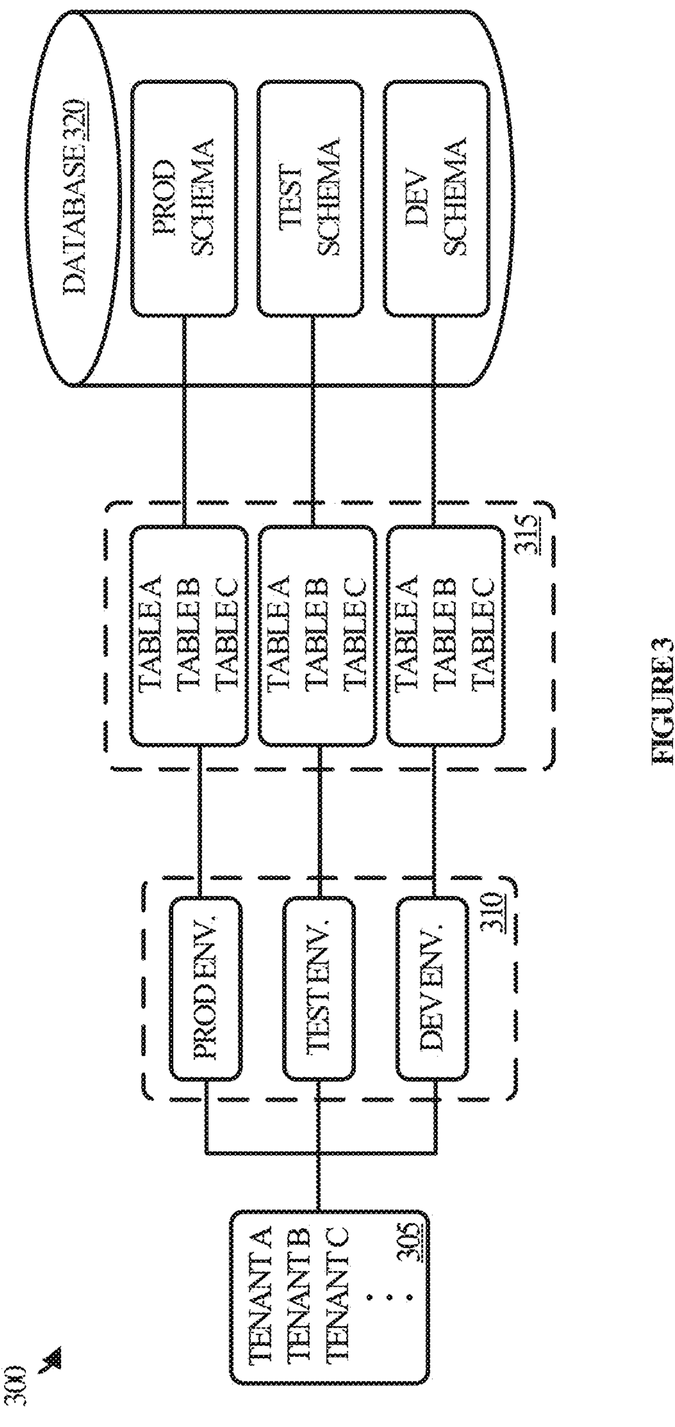
FIG. 3 illustrates an example of a tenant environment associated with a crawling data transform in accordance with some embodiments of the present technology.

FIG. 3 illustrates tenant environment 300, an example of how tenant data may be structured in a cloud-based service platform in accordance with some embodiments of the present technology. Tenant environment 300 includes tenants 305, environments 310, metadata tables 315, and database 320. In the example of FIG. 3, the cloud-based service platform hosts multiple tenants (i.e., customers) including tenant A, tenant B, and tenant C. Associated with each tenant is one or more environments. The number of environments associated with each tenant may differ based on the needs and/or services provided to the tenant. In the example of FIG. 3, tenant A's service platform includes a production environment, a test environment, and a development environment. Each environment provides different services to tenant A. Each environment includes one or more metadata tables leveraged by the environments. In the example of FIG. 3, each environment of environment 310 includes three metadata tables-table A, table B, and table C of metadata tables 315. Each metadata table is communicatively coupled with one or more schemas of database 320. Database 320 includes production schema, test schema, and development schema, each of which store background data accessed and/or leveraged by metadata tables 315.

Figure 4:
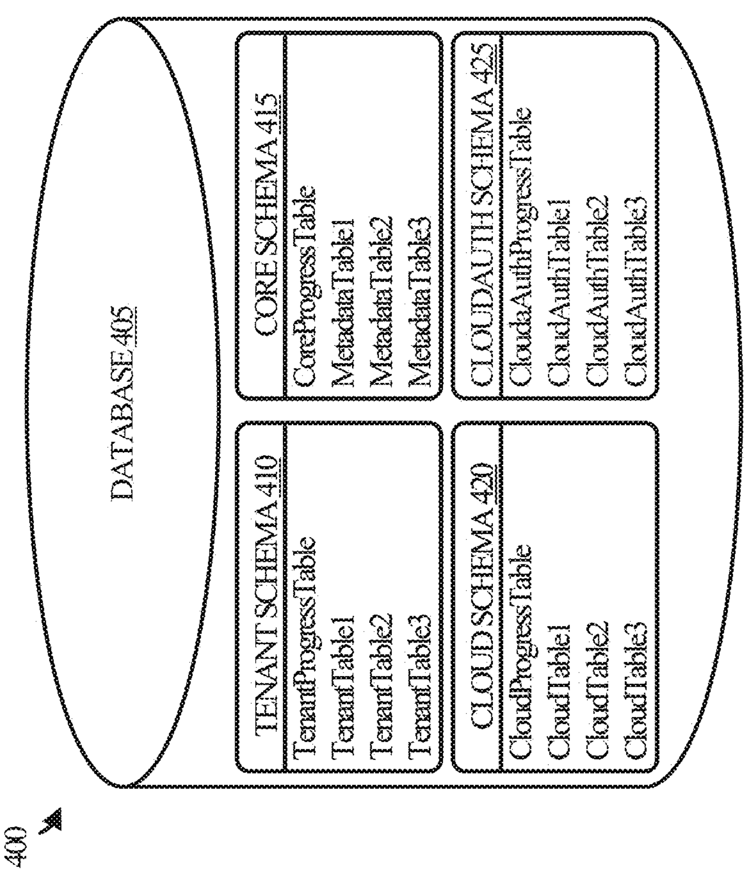
FIG. 4 illustrates an example of a database associated with an ERP platform hosting multiple tenant environments in accordance with some embodiments of the present technology.

FIG. 4 illustrates database environment 400, which is representative of an exemplary database configuration associated with a cloud service provider (e.g., PaaS provider, SaaS provider, IaaS provider, etc.). Database environment 400 includes database 405, which is representative of one of more databases that may be hosted on a single server or distributed across a multitude of servers in the same or different geographic locations. Database 405 includes tenant schema 410, core schema 415, cloud schema 420, and cloudauth schema 425. Tenant schema 410 includes a tenant progress table and a plurality of tenant tables. Core schema 415 includes a core progress table and a plurality of metadata tables. Cloud schema 420 includes a cloud progress table and a plurality of cloud tables. Cloudauth schema 425 includes a cloudauth progress table and a plurality of cloudauth tables.

A key part of the crawling data transform framework disclosed herein is tracking and determining how many records in each table have been already transformed. In a cloud service platform corresponding to the example of FIG. 4, each table in database 405 is created using one of four schemas. Therefore, in accordance with the crawling data transform technology disclosed herein, each of the four schemas include a new progress table for tracking crawling transform progress in each schema. In some examples, each of the four progress tracking tables are the same in nature and include the same fields as previously described (i.e., table name, customer ID, status, last record transformed). In an example, to transform data in tenant schema 410 for a particular tenant, runnable 120 would create three records in the tenant progress table-one for each tenant table (i.e., TenantTable1, TenantTable2, and TenantTable3). If there are two customers that need those tables transformed, then the tenant progress table would include six records tracking the transform progress, each with different values for the customer ID (see, e.g., progress table 220).

Figure 5:
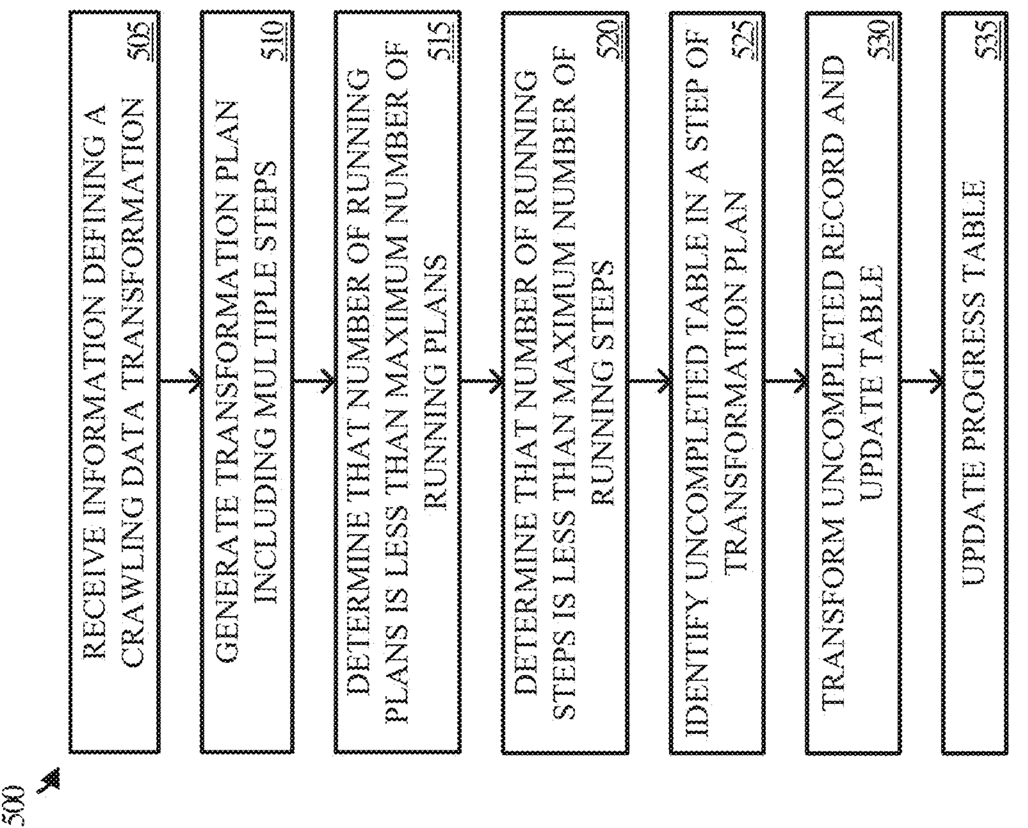
FIG. 5 is a flowchart illustrating a set of operations for implementing crawling data transforms in accordance with some embodiments of the present technology.

FIG. 5 illustrates process 500. Process 500 is an exemplary operation performing crawling data transformations in environment 100. The operations may vary in other examples. The operations of process 500, in some examples, are performed by various components of transform environment 105 including but not limited to planner 110, scheduler 115, and runnable 120. The operations of process 500 include receiving information defining a crawling data transformation (step 505). In the example of FIG. 1, planner 110 may receive information in the form of code, metadata, or other forms defining the data transformation—that is, what data to transform and how to transform it. In some examples, the information is input via one or more graphical user interfaces for submitting crawling data transforms (see, e.g., FIGS. 9A-9C and FIG. 10).

The operations of process 500 further include, upon receiving the information defining the crawling data transformation, generating at least one transformation plan including multiple steps (step 510). In the example of FIG. 1, planner 110 generates multiple orchestration plans (i.e., orchestration plans 125). In other examples, however, planner 110 may generate only a single orchestration plan based on the submitted transform. In the example of FIG. 5, each transformation plan includes multiple steps. In other examples, however, a single transformation may include only a single step. The operations of process 500 further include determining that the number of running plans is less than the maximum number of running plans (step 515). Step 515, in some examples, is performed by scheduler 115. Scheduler 115 is responsible for throttling the crawling transform process to ensure minimal impact on the end user experience. In some examples, scheduler 115 wakes up once every hour to check whether any running plans should be terminated and if any new plans should be kicked off. To determine whether any new plans should be kicked off, scheduler 115, in part, compares the number of running plans against the configurable maximum number of running plans (e.g., two).

The operations of process 500 further include determining that the number of running steps is less than the maximum number of running steps (step 520). In some examples, the maximum number of running steps is a configurable number and is applied on a per-plan basis (i.e., the maximum number of running steps is the maximum number of running steps per plan). In some examples, scheduler 115 wakes up once every hour to check whether the number of running steps per plan is less than the maximum number of running steps per plan and, if it is, kick off new steps. The operations of process 500 further include identifying an uncompleted table in a step of a transformation plan (step 525). Step 525, in some examples, is performed by runnable 120 after scheduler 115 has initiated the associated transformation plan and step (i.e., a step from one of western plan 130, central plan 135, or eastern plan 140). To identify an uncompleted table, runnable 120 may query one or more progress tables.

The operations of process 500 further include transforming an uncompleted record in the uncompleted table and updating the uncompleted table with the transformed record (step 530). In some examples, step 530 is also performed by runnable 120 from FIG. 1. Runnable 120 may, in some examples, reference one or more progress tables (e.g., progress table 220) to first identify the uncompleted record. The one or more progress tables track the last transformed record in each table needing transformed (i.e., containing data meeting the transform criteria). Lastly, after transforming the uncompleted record, runnable 120 updates the one or more progress tables to indicate the new last transformed record (step 535). In some examples, runnable 120 updates the progress table (e.g., progress table 220) after every transformed record. In other examples, runnable 120 updates the progress table at regular intervals, such as after every 100 transformed records, every five minutes, or according to similar criteria.

Figure 6:
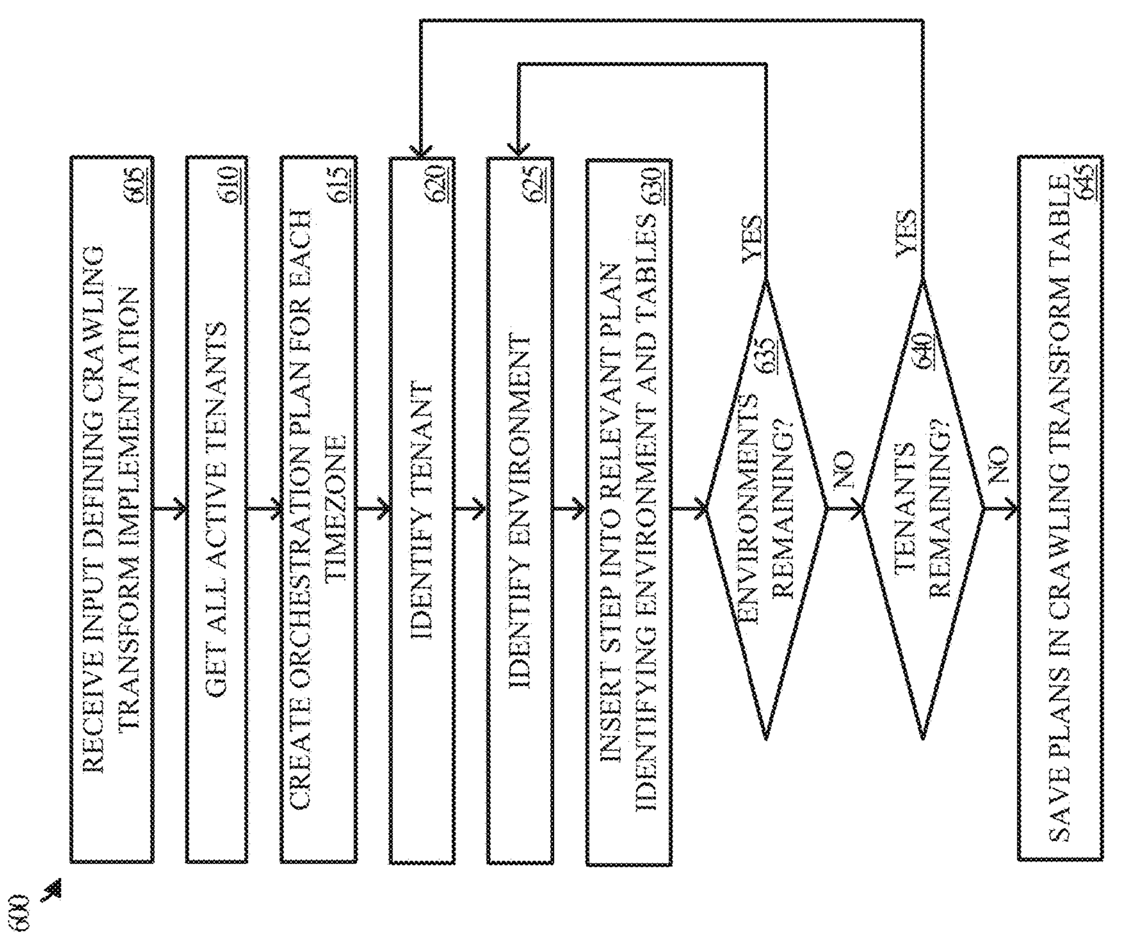
FIG. 6 is a flowchart illustrating a set of operations for implementing crawling data transforms in accordance with some embodiments of the present technology.

FIG. 6 illustrates planning process 600. Planning process 600 is an exemplary operation for planning the execution of crawling data transformations in environment 100. The operations may vary in other examples. The operations of planning process 600, in some examples, are performed at least by planner 110 from FIG. 1. The operations of planning process 600 include receiving input defining a crawling transform implementation (step 605). In some examples, the crawling transform implementation is created in an interface similar to those shown in FIGS. 9A-9C and FIG. 10 and planner 110 is kicked off from the interface.

The operations of planning process 600 further include, upon receiving the input defining the crawling transform implementation, identifying all active tenants (step 610). Step 610, in some examples, includes planner 110 identifying all active tenants in tenant environment 145 (i.e., tenant 150, tenant 155, and tenant 160). The operations further include, once all active tenants are identified, creating an orchestration plan for each time zone associated with the tenants (step 615). For example, planner 110 creates orchestration plans 125 including western plan 130, central plan 135, and eastern plan 140, which are representative of the three different time zones associated with tenant 150, tenant 155, and tenant 160.

The operations of planning process 600 further include identifying each environment for each tenant, getting all tables to transform in each environment, and inserting a step in the relevant orchestration plan for each environment. Thus, in step 620, planner 110 identifies a tenant of the active tenants (e.g., tenant 150). In step 625, planner 110 identifies an environment associated with tenant 150 (e.g., one of environments 310). In step 630, planner 110 inserts a step into the relevant orchestration plan (i.e., western plan 130, central plan 135, or eastern plan 140) identifying the environment and a list of tables in the environment needing transformed. The relevant orchestration plan, in the present example, is whichever orchestration plan is associated with the tenant most recently identified in step 620.

The operations of planning process 600 further includes, after inserting the latest step into the relevant plan, determining whether the tenant has any more environments that planner 110 has not yet created a step for (step 635). If one or more environments remain, planner 110 identifies the next environment in step 625 and creates the next step in step 630. If no environments remain, planner 110 checks whether there are any more tenants that planner 110 has not yet created all steps for (step 640). If one or more tenants remain, planner 110 identifies the next tenant in step 620, and then works through identifying tables and creating steps for each environment in step 625, step 630, and step 635. Once a step has been created for every environment for every tenant, planner 110 saves the created orchestration plans to a crawling transform table, which lists all orchestration plans associated with the crawling transform implementation (see, e.g., FIG. 9B). In some examples, planner 110 saves the plans in the crawling transform table progressively as it works through creating the plans.

Figure 7:
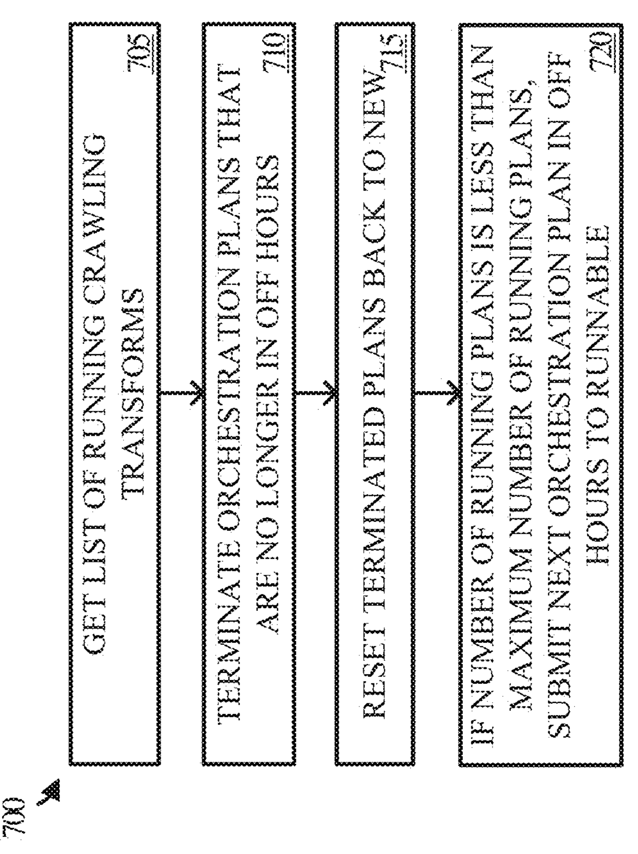
FIG. 7 is a flowchart illustrating a set of operations for implementing crawling data transforms in accordance with some embodiments of the present technology.

FIG. 7 illustrates scheduling process 700. Scheduling process 700 is an exemplary operation for scheduling the execution of orchestration plans 125 in environment 100. The operations may vary in other examples. The operations of scheduling process 700, in some examples, are performed at least by scheduler 115 from FIG. 1. The operations of scheduling process 700 include getting a list of running crawling data transforms (step 705). In some examples, scheduler 115 obtains the list of running crawling data transforms (i.e., the list of all running orchestration plans) from the list of orchestration plans, wherein each orchestration plan in the list includes a status identifying whether it is running. In other examples, scheduler 115 may obtain the list of running crawling data transforms from runnable 120.

Scheduling process 700 further includes terminating any orchestration plans that are no longer in off hours (step 710). As previously described, in some examples, orchestration plans are grouped according to tenant time zones. Thus, if off hours for a time zone are scheduled from 11 PM to 5 AM, scheduler 115 checks if any time zones have reached 5 AM and if any plans associated with those time zones are still running. If so, scheduler 115 terminates the running of those plans. While off hours and time zones are used in the present example, in other examples, orchestration plans may be run according to other transform time windows, which may be based on time zone, scheduled transform hours, or any other criteria that could be used to control the execution of crawling transforms.

Scheduling process 700 further includes resetting the status of any plans terminated in step 710 back to new (step 715). Because the plans were terminated rather than completed during the transform window, the "new" status indicates to scheduler 115 in the future that the plan is not completed and needs to be re-assigned to runnable 120 in a future transform window. In addition to scheduler 115 resetting the status of the plan back to new, runnable 120, in some examples, will store progress information for any steps in the plan in one or more progress tables so that it can pick up where it left off next time the plan is kicked off.

Scheduling process 700 further includes, after terminating the plans that are no longer in off hours, submitting the next orchestration plan in off hours to runnable 120 if the number of running plans is less than the maximum number of running plans (step 720). In some examples, the maximum number of running plans is two. Thus, if less than two orchestration plans are being executed by runnable 120, scheduler 115 may check if another plan is waiting to run and in off hours, and then initiate that plan. If, after initiating the next plan, the number of running plans is still less than the maximum number of running plans, scheduler 115 may repeat the process of checking if other plans are waiting and in off hours and initiating those plans until the maximum number of running plans is met.

Figure 8:
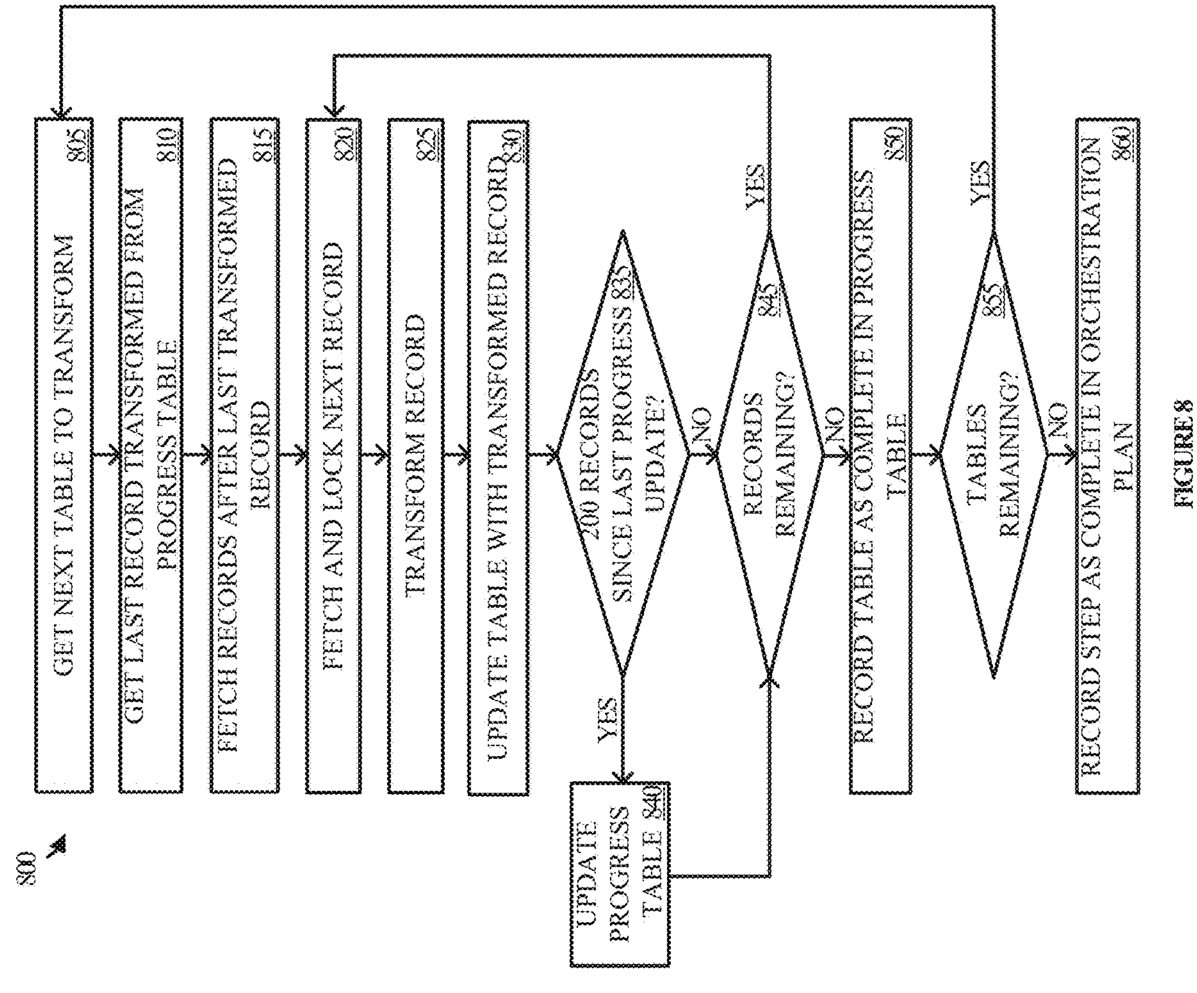
FIG. 8 is a flowchart illustrating a set of operations for implementing crawling data transforms in accordance with some embodiments of the present technology.

FIG. 8 illustrates transform process 800. Transform process 800 is an exemplary operation for executing crawling data transforms, such as orchestration plans 125 in environment 100 by runnable 120. The operations may vary in other examples. The operations of transform process 800, in some examples, are performed at least by runnable 120 from FIG. 1 while executing a step in one of orchestrations plans 125. The operations of transform process 800 include getting the identity of the next table to transform in the step from the list created by the planner in step 630 of planning process 600 (step 805). After getting the next table to transform, runnable 120 gets the identity of the last record transformed in step 810. To identify the next table to transform and/or identify the last record transformed, runnable 120 may leverage one or more progress tables storing information about what has already been completed in the step.

Once the next table and record are identified, runnable 120 fetches one or more records after the last transformed record in the table (step 815). In step 820, runnable 120 fetches and locks the next record from the fetched records. Locking the record, in some embodiments, prevents the record from being changed by any other processes running in the cloud service environment. In step 825, runnable 120 transforms the record. In some examples, transforming the record includes providing the record (e.g., a JSON blob or other form of data) to one or more pieces of code that transform the record and return an updated version of the record. In step 830, runnable 120 updates the table with the new version of the record.

In the examples of FIG. 8, runnable 120 is configured to update the progress associated with the step every 200 records. However, the frequency with which runnable 120 updates the progress table is configurable and may change in different implementations. If runnable 120 has updated 200 records since the last time it updated the progress table (step 835), runnable 120 updates the progress table in step 840. The progress table, in some examples, is progress table 220 from FIG. 2 and updating the progress table may include changing the "last ID transformed" field to reflect the new last record transformed.

If, after updating the table with the transformed record in step 830, records needing to be transformed still remain in the table, runnable 120 repeats steps 820-845 for the next record until no records needing to be transformed are left in the table (step 845). After no records needing to be transformed are left in the table, runnable 120 records the table as complete in the progress table in step 850. If, after recording the table as complete in step 850, there are tables remaining in the step that need to be transformed, runnable 120 repeats steps 805-855 for the next table until no tables needing to be transformed are left in the step (step 855). Once no tables needing to be transformed remain for the step, runnable 120 records the step as complete in the orchestration plan (step 860). Runnable 120 may also record the step as complete in the progress table in some examples.

FIGS. 9A-9C show exemplary views of a graphical user interface for creating and monitoring crawling data transforms in accordance with some embodiments of the present technology. FIG. 9A shows view 900A. View 900A shows the graphical user interface of a Crawling Data Transform Manager during the creation of a new crawling data transform named Currency ValueTransform. Information about the new crawling data transform is entered into various input fields in view 900A before the transform plans for the new crawling data transform are created. View 900A includes a "Crawler Name" field, a "Transform Status" field, a "Support Email" field, and a "Released With" field. View 900A also includes clickable and/or drop-down options to create transform plans, save and exit, refresh, and close. An initial record is created that references the specific crawling transform implementation (i.e., Currency ValueTransform) via view 900A of the Crawling Data Transform Manager. Currency ValueTransform, in the present example, is a crawling data transform implementation that transforms the format in which currency values are stored in all records.

FIG. 9B shows view 900B. View 900B shows the graphical user interface after the transform plans for the new crawling data transform, Currency ValueTransform, are created. A table displayed in view 900B of the Crawling Data Transform Manager includes a list of the transformation plans created based on the information provided during the creation step shown in FIG. 9A. The list of transformation plans includes three plans created from the Currency ValueTransform implementation, each corresponding to a different time zone. Each plan is shown with status "new,"

indicating that none of them are running or completed at the point in time shown in view 900B.

FIG. 9C shows view 900C. View 900C shows the graphical user interface of an Orchestration Manager once the transform plans shown in FIG. 9B are created. View 900C of the Orchestration Manager includes a list of the steps created by the planner during creation of the plans listed in view 900B. View 900C shows the steps of Currency Value Transform plan for the US/Eastern time zone. Each step is listed with a label, details, and status. View 900C includes an option to deploy the step, selection of which may initiate running of steps listed. Each step shown in view 900C includes a list of tables to transform in each environment for each tenant.

Figure 10:
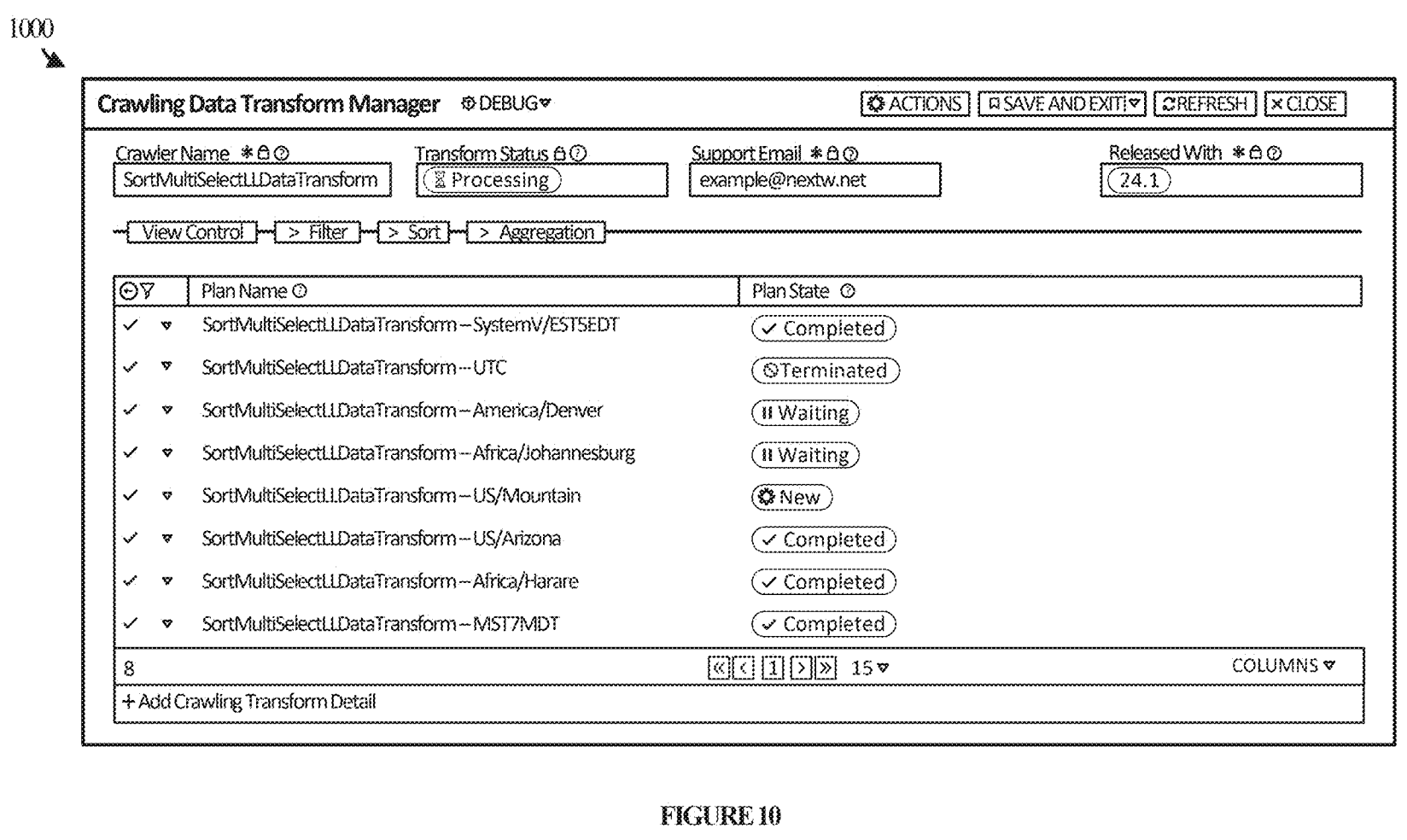

FIG. 10 shows an exemplary view of a graphical user interface for creating and monitoring crawling data transforms in accordance with some embodiments of the present technology. FIG. 10 shows view 1000 of the Crawling Data Transform Manager after creation of a set of orchestration plans for a transform implementation named SortMultiSelectLLDataTransform. The transform implementation SortMultiSelectLLDataTransform, in the present example, transforms the format in which multiselect data is stored. For example, the transform may change all multiselect data to be stored in alphabetical order inside of each record.

Similar to the example in FIG. 9B, the Crawling Data Transform Manager of view 1000 shows a list of plans created by the planner for the crawling transform implementation SortMultiSelectLLDataTransform. In the example of FIG. 10, the transform implementation SortMultiSelectLLDataTransform includes eight plans each corresponding to a different time zone. The list of plans also includes the status of each plan. As shown in FIG. 10, some of the plans have the status "Completed," indicating that all steps of the plan have completed, some of the plans have the status "Terminated," indicating that all steps of the plan could not be completed due to termination by the scheduler, some of the plans have the status "Waiting," indicating that the plan is in off hours but no steps are running, and some of the plans have the status "New," indicating that the steps of the plan have not been started or the runnable is waiting to pick the steps back up during off hours.

FIG. 11 illustrates computing system 1101 to perform crawling data transform operations according to an implementation of the present technology. Computing system 1101 is representative of any computing system or collection of systems with which the various operational architectures, processes, scenarios, and sequences disclosed herein for transforming large amounts of data in a throttled manner. Computing system 1101 may be implemented as a single apparatus, system, or device or may be implemented in a distributed manner as multiple apparatuses, systems, or devices.

Computing system includes 1101 storage system 1103, communication interface 1107, user interface 1109, and processing system 1102. Processing system 1102 is linked to communication interface 1107 and user interface 1109. Storage system 1103 stores operates software 1105, which includes crawling data transform process 1106. Computing system 1101 may include other well-known components such as batteries and enclosures that are not shown in the present example for clarity. Examples of computing system 1101 include, but are not limited to, desktop computers, laptop computers, server computers, routers, web servers, cloud computing platforms, and data center equipment, as well as any other type of physical or virtual server machines, physical or virtual routers, containers, and any variation or combination thereof.

Processing system 1102 loads and executes software 1105 from storage system 1103. Software 1105 includes and implements crawling data transform process 1106, which is representative of the crawling data transform operations discussed with respect to the preceding figures. When executed by processing system 1102 to perform the processes described herein, software 1105 directs processing system 1102 to operate as described for at least the various processes, operational scenarios, and sequences discussed in the foregoing implementations. Computing system 1101 may optionally include additional devices, features, or functionality not discussed for purposes of brevity.

Referring still to FIG. 11, processing system 1102 may include a micro-processor and other circuitry that retrieves and executes software 1105 from storage system 1103. Processing system 1102 may be implemented within a single processing device but may also be distributed across multiple processing devices or sub-systems that cooperate in executing program instructions. Examples of processing system 1102 include general purpose central processing units, graphical processing units, application specific processors, and logic devices, as well as any other type of processing devices, combinations, or variations thereof.

User interface 1109 includes components that interact with a user to receive user inputs and to present media and/or information. User interface 1109 may include a speaker, microphone, buttons, lights, display screen, touch screen, touch pad, scroll wheel, communication port, or some other user input/output apparatus, including combinations thereof. User interface 1109 may be omitted in some examples.

Storage system 1103 may include any computer-readable storage media readable by processing system 1102 and capable of storing software 1105. Storage system 1103 may include volatile and nonvolatile, removable, and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer-readable storage media a propagated signal.

In addition to computer-readable storage media, in some implementations storage system 1103 may also include computer-readable communication media over which at least some of software 1105 may be communicated internally or externally. Storage system 1103 may be implemented as a single storage device but may also be implemented across multiple storage devices or sub-systems co-located or distributed relative to each other. Storage system 1103 may include additional elements, such as a controller, capable of communicating with processing system 1102 or possibly other systems.

Software 1105 (including crawling data transform process 1106) may be implemented in program instructions and among other functions may, when executed by processing system 1102, direct processing system 1102 to operate as described with respect to the various operational scenarios, sequences, and processes illustrated herein. For example, software 1105 may include program instructions for implementing crawling data transform functionality in a cloud-based service environment as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1105 may include additional processes, programs, or components, such as operating system software, virtualization software, or other application software. Software 1105 may also include firmware or some other form of machine-readable processing instructions executable by processing system 1102.

In general, software 1105 may, when loaded into processing system 1102 and executed, transform a suitable apparatus, system, or device (of which computing system 1101 is representative) overall from a general-purpose computing system into a special-purpose computing system customized to provide crawling data transform functionality as described herein. Indeed, encoding software 1105 on storage system 1103 may transform the physical structure of storage system 1103. The specific transformation of the physical structure may depend on various factors in different implementations of this description. Examples of such factors may include, but are not limited to, the technology used to implement the storage media of storage system 1103 and whether the computer-storage media are characterized as primary or secondary storage, as well as other factors.

For example, if the computer readable storage media are implemented as semiconductor-based memory, software 1105 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface 1107 may include communication connections and devices that allow for communication with other computing systems (not shown) over communication networks (not shown). Examples of connections and devices that together allow for inter-system communication may include network interface cards, ports, antennas, power amplifiers, radio frequency (RF) circuitry, transceivers, and other communication circuitry. The connections and devices may communicate over communication media to exchange communications with other computing systems or networks of systems, such as metal, glass, air, or any other suitable communication media. Communication interface 1107 may be configured to use Time Division Multiplex (TDM), Internet Protocol (IP), Ethernet, optical networking, wireless protocols, communication signaling, or some other communication format, including combinations thereof. The aforementioned media, connections, and devices are well known and need not be discussed at length here.

Communication between computing system 1101 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

The techniques introduced herein may be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media or machine-readable medium suitable for storing electronic instructions.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "platform," "environment," or "system." Furthermore, aspects of the present invention may take the form of a computer program product embodied in one or more computer readable medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number, respectively. The word "or," in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further, any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method of operating a computing system, the method comprising:

receiving information defining a data transformation;

generating a data transformation plan comprising multiple steps, wherein each step of the multiple steps comprises at least one table storing data to transform according to the data transformation;

determining, by a scheduler operating at regular intervals, that a number of running steps is less than a maximum number of running steps;

upon determining that the number of running steps is less than the maximum number of running steps, identifying, by the scheduler, an uncompleted table in the data transformation plan;

referencing a progress table to identify a last transformed record in the uncompleted table, wherein the progress table stores an identifier of the last transformed record;

locking an uncompleted record in the uncompleted table after the last transformed record, wherein locking the uncompleted record prevents the uncompleted record from being changed by other processes;

transforming the uncompleted record in the uncompleted table to generate a transformed record and updating the uncompleted table with the transformed record; and updating the progress table to store an identifier of the transformed record, wherein the scheduler, upon a subsequent interval, references the progress table to resume transforming the uncompleted table from the last transformed record.

2. The method of claim 1, further comprising, prior to identifying the uncompleted table in the data transformation plan, determining that a number of running data transformation plans is less than a maximum number of running data transformation plans.

3. The method of claim 2, further comprising:

upon determining that that the number of running data transformation plans is less than the maximum number of running data transformation plans, determining that a next data transformation plan that is not running is inside a transform time window; and initiating the next data transformation plan.

4. The method of claim 1, further comprising:

determining that the data transformation plan is outside a transform time window; and terminating the data transformation plan.

5. The method of claim 1, further comprising generating a second data transformation plan comprising multiple steps, wherein each step of the multiple steps of the second data transformation plan comprises at least one table storing data to transform according to the data transformation.

6. The method of claim 1, further comprising, upon transforming the uncompleted record and updating the uncompleted table with the transformed record, updating the progress table indicating that the uncompleted record was transformed.

7. The method of claim 1, further comprising, after transforming the uncompleted record and updating the uncompleted table with the transformed record:

determining that the uncompleted table comprises no additional uncompleted records; and updating the progress table indicating that transforming the uncompleted table according to the data transformation is complete.

8. The method of claim 7, further comprising, after determining that the uncompleted table comprises no additional uncompleted records:

identifying a second uncompleted table;

transforming every uncompleted record in the second uncompleted table; and updating the progress table indicating that transforming the second uncompleted table according to the data transformation is complete.

9. The method of claim 8, further comprising:

determining that every table of a step of the multiple steps of the data transformation plan has been transformed according to the data transformation; and in response to determining that every table in the step of the multiple steps of the data transformation plan has been transformed, updating the progress table indicating that the step of the multiple steps of the data transformation plan is complete.

10. The method of claim 9, further comprising:

determining that every step of the multiple steps of the data transformation plan has been completed according to the data transformation; and updating the progress table indicating that the data transformation plan is complete.

11. One or more computer-readable storage media having program instructions stored thereon for performing crawling data transforms, wherein the program instructions, when read and executed by a processing system, direct the processing system to at least:

receive information defining a data transformation;

generate a data transformation plan comprising multiple steps, wherein each step of the multiple steps comprises at least one table storing data to transform according to the data transformation;

determine, by a scheduler operating at regular intervals, that a number of running steps is less than a maximum number of running steps;

upon determining that the number of running steps is less than the maximum number of running steps, identify, by the scheduler, an uncompleted table in the data transformation plan;

reference a progress table to identity a last transformed record in the uncompleted table, wherein the progress table stores an identifier of the last transformed record;

lock an uncompleted record in the uncompleted table after the last transformed record, wherein locking the uncompleted record prevents the uncompleted record from being changed by other processes;

transform the uncompleted record in the uncompleted table to generate a transformed record and update the uncompleted table with the transformed record; and update the progress table to store an identifier of the transformed record, wherein the scheduler, upon a subsequent interval, references the progress table to resume transforming the uncompleted table from the last transformed record.

12. The one or more computer-readable storage media of claim 11, wherein the program instructions, when read and executed by the processing system, further direct the processing system to, prior to identifying the uncompleted table in the data transformation plan, determine that a number of running data transformation plans is less than a maximum number of running data transformation plans.

13. The one or more computer-readable storage media of claim 12, wherein the program instructions, when read and executed by the processing system, further direct the processing system to:

upon determining that that the number of running data transformation plans is less than the maximum number of running data transformation plans, determine that a next data transformation plan that is not running is inside a transform time window; and initiate the next data transformation plan.

14. The one or more computer-readable storage media of claim 11, wherein the program instructions, when read and executed by the processing system, further direct the processing system to:

determine that the data transformation plan is outside a transform time window; and terminate the data transformation plan.

15. The one or more computer-readable storage media of claim 11, wherein the program instructions, when read and executed by the processing system, further direct the processing system to generate a second data transformation plan comprising multiple steps, wherein each step of the multiple steps of the second data transformation plan comprises at least one table storing data to transform according to the data transformation.

16. The one or more computer-readable storage media of claim 11, wherein the program instructions, when read and executed by the processing system, further direct the processing system to, upon transforming the uncompleted record and updating the uncompleted table with the transformed record, update the progress table indicating that the uncompleted record was transformed.

17. The one or more computer-readable storage media of claim 11, further comprising, after transforming the uncompleted record and updating the uncompleted table with the transformed record:

determine that the uncompleted table comprises no additional uncompleted records; and update the progress table indicating that transforming the uncompleted table according to the data transformation is complete.

18. The one or more computer-readable storage media of claim 17, wherein the program instructions, when read and executed by the processing system, further direct the processing system to, after determining that the uncompleted table comprises no additional uncompleted records:

identify a second uncompleted table;

transform each uncompleted record in the second uncompleted table; and update the progress table indicating that transforming the second uncompleted table according to the data transformation is complete.

19. The one or more computer-readable storage media of claim 18, wherein the program instructions, when read and executed by the processing system, further direct the processing system to:

determine that every table of a step of the multiple steps of the data transformation plan has been transformed according to the data transformation; and in response to determining that every table of the step of the multiple steps of the data transformation has been transformed, update the progress table indicating that the step of the multiple steps of the data transformation plan is complete.

20. A system comprising:

one or more computer-readable storage media;

a processing system operatively coupled with the one or more computer-readable storage media; and program instructions stored on the one or more computer-readable storage media for providing crawling data transformation capabilities, wherein the program instructions, when read and executed by the processing system, direct the processing system to at least:

receive information defining a data transformation;

generate a data transformation plan comprising multiple steps, wherein each step of the multiple steps comprises at least one table storing data to transform according to the data transformation;

determine, by a scheduler operating at regular intervals, that a number of running steps is less than a maximum number of running steps;

upon determining that the number of running steps is less than the maximum number of running steps, identify, by the scheduler, an uncompleted table in the data transformation plan;

reference a progress table to identify a last transformed record in the uncompleted table, wherein the progress table stores an identifier of the last transformed record;

lock an uncompleted record in the uncompleted table after the last transformed record, wherein locking the uncompleted record prevents the uncompleted record from being changed by other processes;

transform the uncompleted record in the uncompleted table to generate a transformed record and update the uncompleted table with the transformed record; and update the progress table to store an identifier of the transformed record, wherein the scheduler, upon a subsequent interval, references the progress table to resume transforming the uncompleted table from the last transformed record.

* * * * *